United States Patent
Grewal et al.

(10) Patent No.: US 12,052,496 B2
(45) Date of Patent: Jul. 30, 2024

(54) VIDEO SURVEILLANCE SYSTEM WITH DISTRIBUTED INTELLIGENCE

(71) Applicant: HONEYWELL INTERNATIONAL INC.

(72) Inventors: Amit Grewal, Charlotte, NC (US); Bhavya Kumar, Charlotte, NC (US); Lalitha M. Eswara, Charlotte, NC (US); Rajeev Sharma, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/806,383

(22) Filed: Jun. 10, 2022

(65) Prior Publication Data

US 2022/0408009 A1    Dec. 22, 2022

(30) Foreign Application Priority Data

Jun. 17, 2021  (IN) .............................. 202111027026

(51) Int. Cl.
  *H04N 23/66*   (2023.01)
  *G06V 20/40*   (2022.01)
  (Continued)

(52) U.S. Cl.
  CPC ........... *H04N 23/662* (2023.01); *G06V 20/41* (2022.01); *G06V 20/44* (2022.01); *G06V 20/52* (2022.01);
  (Continued)

(58) Field of Classification Search
  CPC .................................................... H04N 23/662
  See application file for complete search history.

(56) References Cited

U.S. PATENT DOCUMENTS

| 10,334,437 B2 | 6/2019 | Katsman et al. |
| 10,616,465 B2 | 4/2020 | Chowdhery et al. |

(Continued)

FOREIGN PATENT DOCUMENTS

| CN | 106576160 A | 4/2017 |
| CN | 208674967 U | 3/2019 |

(Continued)

OTHER PUBLICATIONS

Chen, Jianguo, et al., "Distributed Deep Learning Model for Intelligent Video Surveillance Systems with Edge Computing," ARXIN. ORG, Cornell University Library, 201 Olin Library Cornell University Ithaca, NY 14853, Apr. 12, 2019, XP081168769, DOI: 10.1109/TII.2019.2909473 (9 pages).

(Continued)

*Primary Examiner* — Daniel T Tekle
(74) *Attorney, Agent, or Firm* — Seager, Tufte & Wickhem, LLP

(57) ABSTRACT

An event of interest may be tracked using a distributed intelligence video surveillance system. The distributed intelligence video surveillance system includes a lead video camera and a plurality of child video cameras that are configured to communicate with the lead video camera. One of the plurality of child video cameras may receive a video image and perform analytics and event generation for any events of interest found within the video image. The child video camera extracts metadata for any found events of interest and communicates the extracted metadata to the lead video camera. The lead video camera communicates the extracted metadata to others of the plurality of child video cameras so that the others of the plurality of child video cameras can be alerted to track the found events of interest.

18 Claims, 10 Drawing Sheets

(51) Int. Cl.
*G06V 20/52* (2022.01)
*H04N 7/18* (2006.01)
*H04N 23/661* (2023.01)
*H04N 23/695* (2023.01)
*H04W 84/04* (2009.01)

(52) U.S. Cl.
CPC ........... *H04N 7/181* (2013.01); *H04N 23/695* (2023.01); *G06V 2201/10* (2022.01); *H04W 84/042* (2013.01)

(56) References Cited

U.S. PATENT DOCUMENTS

| | | |
|---|---|---|
| 2006/0077254 A1 | 4/2006 | Shu et al. |
| 2012/0044354 A1 | 2/2012 | Cheng et al. |
| 2015/0195324 A1 | 7/2015 | Kim |
| 2016/0006989 A1 | 1/2016 | Swanson |
| 2018/0343379 A1* | 11/2018 | Suwa ................ G08B 13/19658 |

FOREIGN PATENT DOCUMENTS

| | | | |
|---|---|---|---|
| CN | 106657867 B | 8/2019 | |
| CN | 211787395 U | 10/2020 | |
| GB | 2455837 A * | 6/2009 | ....... G08B 13/19608 |
| GB | 2455837 A | 6/2009 | |

OTHER PUBLICATIONS

European Extended Search Report, European Patent Office, EP Application No. 22177861.6, Oct. 6, 2022 (10 pgs).
Indian Office Action, IN Application No. 202111027026, India Patent Office, Jun. 30, 2023 (5 pages).

* cited by examiner

VIDEO SURVEILLANCE SYSTEM WITH DISTRIBUTED INTELLIGENCE

CROSS-REFERENCE TO RELATED APPLICATIONS

This application claims priority pursuant to 35 U.S.C. 119(a) to India Patent Application No. 202111027026, filed Jun. 17, 2021, which application is incorporated herein by reference in its entirety.

TECHNICAL FIELD

The present disclosure relates generally to video surveillance systems. More particularly, the present disclosure relates to video surveillance systems that utilize distributed intelligence between lead and child video cameras.

BACKGROUND

A number of video surveillance systems employ video cameras that are installed or otherwise arranged around a surveillance area such as a city, a portion of a city, a facility or a building. Video surveillance systems may also include mobile video cameras, such as drones carrying video cameras. Each video camera has a field of view that corresponds to what can be seen by that particular video camera at its particular physical location. When an incident or possible incident is detected within one or more video streams provided by one or more video cameras, it is possible that the field of view provided by one or more other video cameras may actually have a better view of the detected incident. Moreover, the detected incident may be moving, which means that the detected incident may move out of the field of view of one camera and into the field of view of another camera. Cooperation and communication between video cameras can allow improved surveillance by quickly obtaining additional information regarding the detected incident, particularly if the video cameras are able to quickly share relevant metadata concerning the detected incident. What would be desirable is a video surveillance system in which system intelligence is distributed between the video cameras and/or video camera groups.

SUMMARY

The present disclosure relates to video surveillance systems. In an example, a video surveillance system is configured to provide surveillance for a secured area. The video surveillance system includes a camera group having a lead video camera and a plurality of child video cameras that are configured to communicate with the lead video camera. The lead video camera and each of the plurality of child video cameras are configured to capture a video stream corresponding to a field of view of the particular video camera.

Each of the child video cameras include an edge controller that monitors its corresponding video stream for one or more predefined events of interest, and when one of the predefined events of interest is found, the edge controller generates metadata pertaining to the corresponding event of interest. In some cases, the metadata includes a video image and/or a video clip that represents the corresponding event of interest. Each child video camera includes a transmitter for transmitting the generated metadata to the lead video camera, including the video image and/or the video clip that represents the corresponding event of interest. Each child video camera further includes a receiver for receiving metadata. The lead video camera includes a receiver for receiving the metadata from the transmitter of each of the plurality of child video cameras, including the video images and/or the video clips that represent the events of interest identified by the plurality of child video cameras. The lead video camera includes a first transmitter for transmitting at least some of the metadata received from the transmitter of one of the plurality of child video cameras to the receiver of another of the plurality of child video cameras. The lead video camera includes a second transmitter for transmitting the metadata received from the transmitters of one or more of the plurality of child video cameras, including the video images and/or the video clips that represent the events of interest identified by the one or more of the plurality of child video cameras, to a remote site for recording on a network video recorder.

In another example, a method of detecting and tracking an event of interest using a distributed intelligence video surveillance system is provided. The distributed intelligence video surveillance system includes a lead video camera and a plurality of child video cameras that are configured to communicate with the lead video camera. The method includes one of the plurality of child video cameras receiving a video image and performing analytics and event generation for any events of interest found within the video image. The child video camera extracts metadata for any found events of interest and communicates the extracted metadata to the lead video camera. The lead video camera communicates the extracted metadata to others of the plurality of child video cameras so that the others of the plurality of child video cameras can be alerted to track the found events of interest.

In another example, a video surveillance system is configured to provide surveillance for a secured area. The video surveillance system includes a camera group having a lead video camera and a plurality of child video cameras that are configured to communicate with the lead video camera. The lead video camera and each of the plurality of child video cameras are configured to capture a video stream corresponding to a field of view for the particular video camera. Each child camera is configured to analyze its video stream for an event of interest. When an event of interest is found, each child camera generates captures metadata from its video stream, the metadata pertaining to the event of interest, and to transmit the captured metadata to the lead video camera via a first communication protocol. The lead video camera is configured to receive metadata from each of the plurality of child video cameras via the first communication protocol. The lead video camera is configured to communicate with other lead cameras of other camera groups and/or with a remote video surveillance system controller via the second communication protocol.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
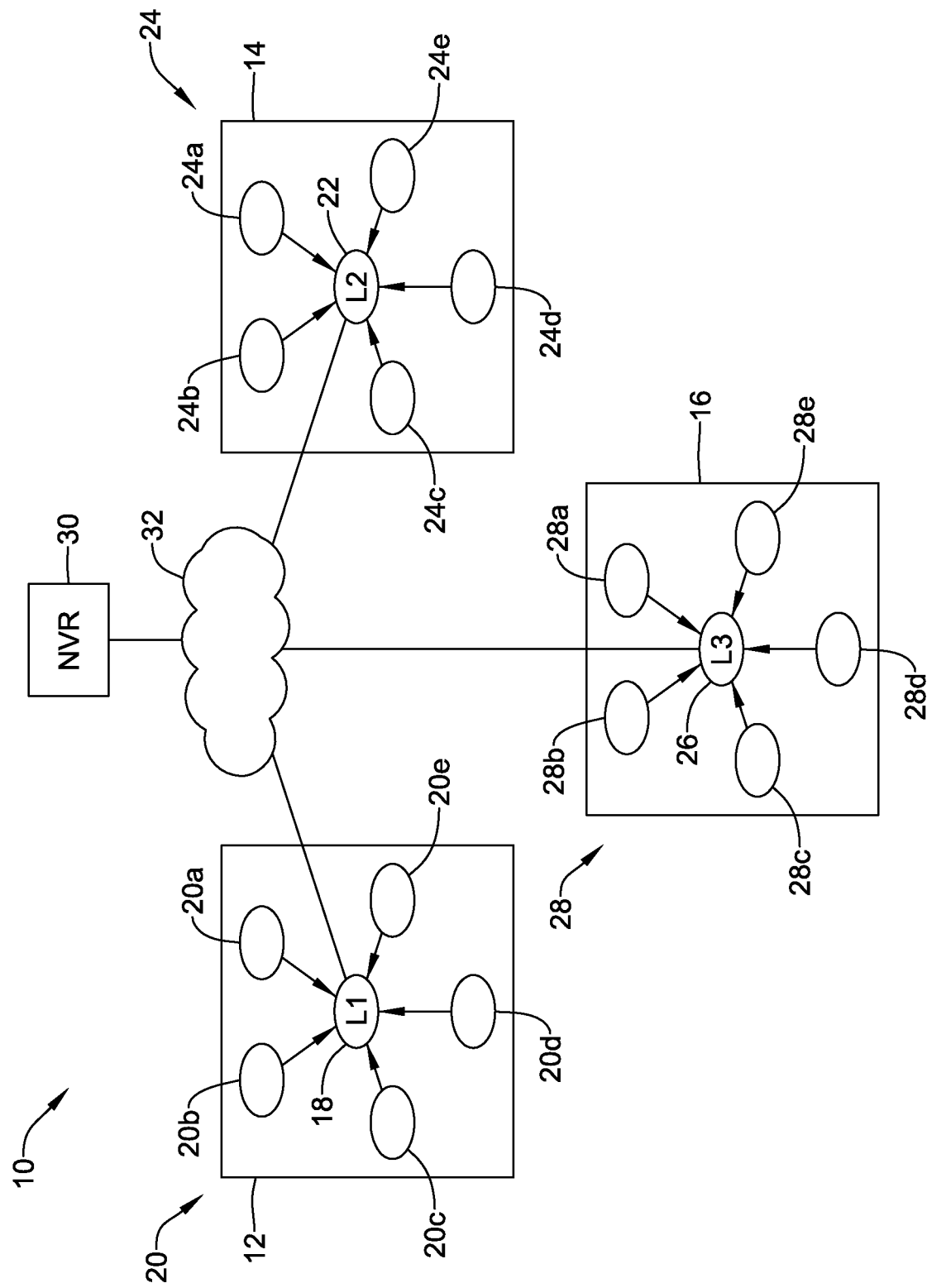
FIG. 1 is a schematic block diagram of an illustrative video surveillance system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative video surveillance system 10. The illustrative video surveillance system 10 includes a first camera group 12, a second camera group 14 and a third camera group 16. While a total of three camera groups 12, 14, 16 are shown, it will be appreciated that this is merely illustrative, as the video surveillance system 10 may include any number of camera groups. The first camera group 12 includes a lead video camera 18 and a number of child video cameras 20, individually labeled as 20a, 20b, 20c, 20d and 20e. While a total of five child video cameras 20 are shown, it will be appreciated that the first camera group 12 may include any number of child video cameras 20, such as one, two, three, four, six, seven or more child video cameras 20. Each of the child video cameras 20 are configured to communicate with the lead video camera 18. Each of the lead video camera 18 and each of the plurality of child video cameras 20 are configured to capture a video stream corresponding to a field of view of the particular video camera. In some instances, the lead video camera 18 may be considered to have a master-slave relationship each of the child video cameras 20, but this is not required. The lead video camera 18, 22, 26 in one camera group 12, 14, 16 can work together with other lead video cameras 18, 22, 26 in other camera groups 12, 14, 16 in order to track an event as it propagates through time and space. A particular lead video camera 18, 22, 26 may utilize the corresponding child video cameras 20, 24, 28 within its particular camera group 12, 14, 16 to help track event propagation.

Within a particular camera group 12, 14, 16, it will be understood that signal strength is inversely proportional to the distance between two objects that are trying to communicate with each other. An estimate of the distance between a particular child video camera 20 and the lead video camera 18 may be determined in accordance with the equation:

$$d(m)=10(FSPL(dB)-K-20 \log 10(f)/20$$

where, d=distance f=frequency

FSPL=Free Space Path Loss

K=constant that depends on the units used for d and f.

In some cases, a determination as to which child video cameras form a particular camera group with a particular lead video camera is made based on received signal strength (RSSI). Each child video camera may be included within a particular camera group having a lead video camera with which it is close enough to be able to communicate well, with a good signal strength and a good SNR (signal to noise ratio). In some cases, the lead video camera may receive the RSSI information from each child video camera, and may itself determine which child video cameras it will form a camera group with. In some cases, each child video camera may determine which lead video camera to align itself with based on the RSSI information from nearby lead video cameras.

In the example shown, the second camera group 14 includes a lead video camera 22 and a number of child video cameras 24, individually labeled as 24a, 24b, 24c, 24d and 24e. While a total of five child video cameras 24 are shown, it will be appreciated that the second camera group 14 may include any number of child video cameras 24, such as one, two, three, four, six, seven or more child video cameras 20. Each of the child video cameras 24 are configured to communicate with the lead video camera 22. Each of the lead video camera 22 and each of the plurality of child video cameras 24 are configured to capture a video stream corresponding to a field of view of the particular video camera. In some instances, the lead video camera 22 may be considered as having a master-slave relationship and each of the child video cameras 24, but this is not required.

The third camera group 16 includes a lead video camera 26 and a number of child video cameras 28, individually labeled as 28a, 28b, 28c, 28d and 28e. While a total of five child video cameras 28 are shown, it will be appreciated that the third camera group 16 may include any number of child video cameras 28, such as one, two, three, four, six, seven or more child video cameras 28. Each of the child video cameras 28 are configured to communicate with the lead video camera 26. Each of the lead video camera 26 and each of the plurality of child video cameras 28 are configured to capture a video stream corresponding to a field of view of the particular video camera. In some instances, the lead video camera 26 may be considered as having a master-slave relationship and each of the child video cameras 28, but this is not required.

The illustrative video surveillance system 10 includes an NVR (networked video recorder) 30. Each of the lead video cameras 18, 22, 26 are configured to communicate with the NVR 30 via a network 32. Each of the child video cameras 20, 24, 28 are configured to communicate with the lead video camera 18, 22, 26 that is part of the camera group 12, 14, 16 to which the particular child video camera 20, 24, 28 and corresponding lead video camera 18, 22, 26 both belong. The lead video cameras 18, 22, 26 are configured to communicate with the NVR 30 via the network 32. In some cases, as will be discussed, the lead video cameras 18, 22, 26 may also be configured to communicate with other lead video cameras 18, 22, 26 that are located within other camera groups 12, 14, 16, sometimes via the network 32 and/or some other network (not shown).

In some instances, each of the child video cameras 20, 24, 28 are configured to communicate with their corresponding lead video camera 18, 22, 26 using a first communication protocol. In some instances, each of the lead video cameras 18, 22, 26 are configured to communicate with the NVR 30 via the network 32 using a second communication protocol that has a higher bandwidth and/or higher transmission rate than that provided by the first communication protocol. In some cases, the lead video cameras 18, 22, 26 are able to communicate with other lead video cameras 18, 22, 26 using the same second communication protocol, or with another communication protocol. The first communication protocol and the second communication protocol may be wireless communication protocols. In some cases, the first communication protocol may be a 4G cellular communication protocol, and the second communication protocol may a 5G cellular communication protocol, but this is just one example. Accordingly, in some instances, the network 32 may represent a 5G cellular network. It will be appreciated that a 5G cellular communication protocol can provide substantial bandwidth and/or transmission rate advantages over other cellular communication protocol, such as but not limited to a 4G cellular communication protocol. The lead video cameras 18, 22, 26 may be considered in some cases as acting as a 4G hotspot, enabling the child video cameras 20, 24, 28 to communicate with their corresponding lead video camera 18, 22, 26 over 4G. The lead video cameras 18, 22, 26 may also be considered as acting as a 5G hotspot, enabling the lead video cameras 18, 22, 26 to communicate directly with other lead video cameras 18, 22, 26. In some cases, the first communication protocol and/or second communication protocol may be or may include other wireless communication protocols such as Wifi, BLE, ZigBee, Z-Wave, 6LoWPAN, thread, 2G, 3G, 4G, 5G, LTE, NB-IoT, SigFox, LoraWAN, Ingenu, Weightless, EnOcean, Dash7, WirelessHART, and/or any other suitable wireless communication protocol.

Figure 2:
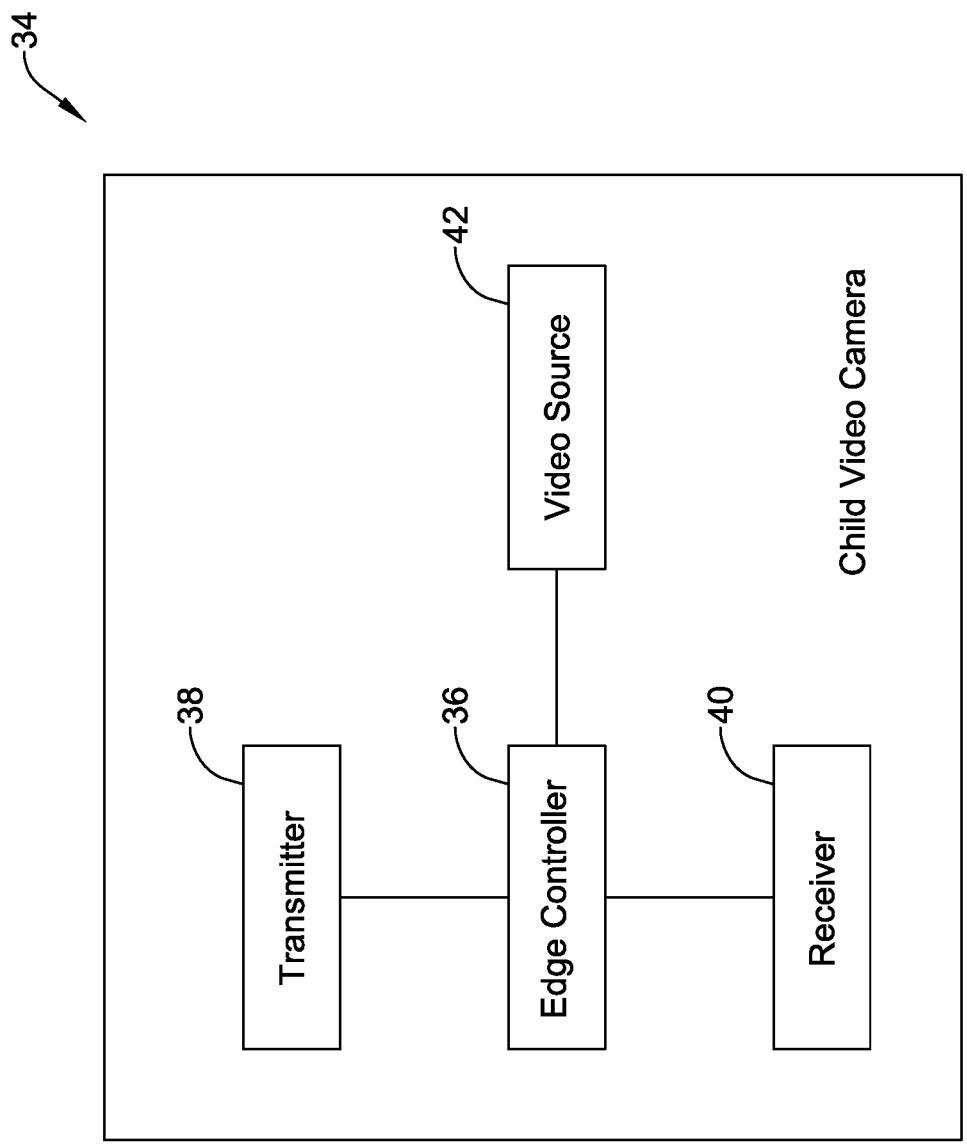
FIG. 2 is a schematic block diagram of an illustrative child video camera usable in the illustrative video surveillance system of FIG. 1.

FIG. 2 is a schematic block diagram of an illustrative child video camera 34. The illustrative child video camera 34 may be considered as being an example of the child video cameras 20, 24, 28. The child video camera 34 includes an edge controller 36 that is configured to perform analytics and monitor its corresponding video stream for one or more predefined events of interest, and when one of the predefined events of interest is found, the edge controller 36 is configured to generate metadata pertaining to the corresponding event of interest. In some cases, the metadata includes a video image and/or a video clip that represents the corresponding event of interest. The child video camera 34 includes a transmitter 38 for transmitting the generated metadata to a lead video camera such as the lead video camera 18, 22, 26, including for example the video image and/or the video clip that represents the corresponding event of interest as well as other metadata. The child video camera 34 includes a receiver 40 for receiving metadata. The child video camera 34 also includes a video source 42. The video source 42 may be a video camera that is built into the child video camera 42, for example.

In some instances, one or more of the predefined events of interest for which the child video camera 34 searches may include a presence of person having one or more predetermined characteristics, a group of people having one or more predetermined characteristics, a person exhibiting one or more predetermined behaviors, a group of people exhibiting one or more predetermined behaviors, an animate object having one or more predetermined characteristics and/or an animate object exhibiting one or more predetermined behaviors. In some instances, one or more of the predefined events of interest may include a presence of an inanimate object having one or more predetermined characteristics or a group of inanimate objects having one or more predetermined characteristics. The metadata generated by the child video camera 34 may include information identifying the child video camera 34 and/or one or more features of the identified event of interest. In some cases, the edge controller 36 may include a self-learning module that can identify events of interest that are deemed to be abnormal based upon normal patterns previously established by the self-learning module. In some instances, the child video camera 34 may determine whether to communicate metadata related to a particular found event to its lead video camera, sometimes based on a determined severity of the identified event of interest.

Figure 3:
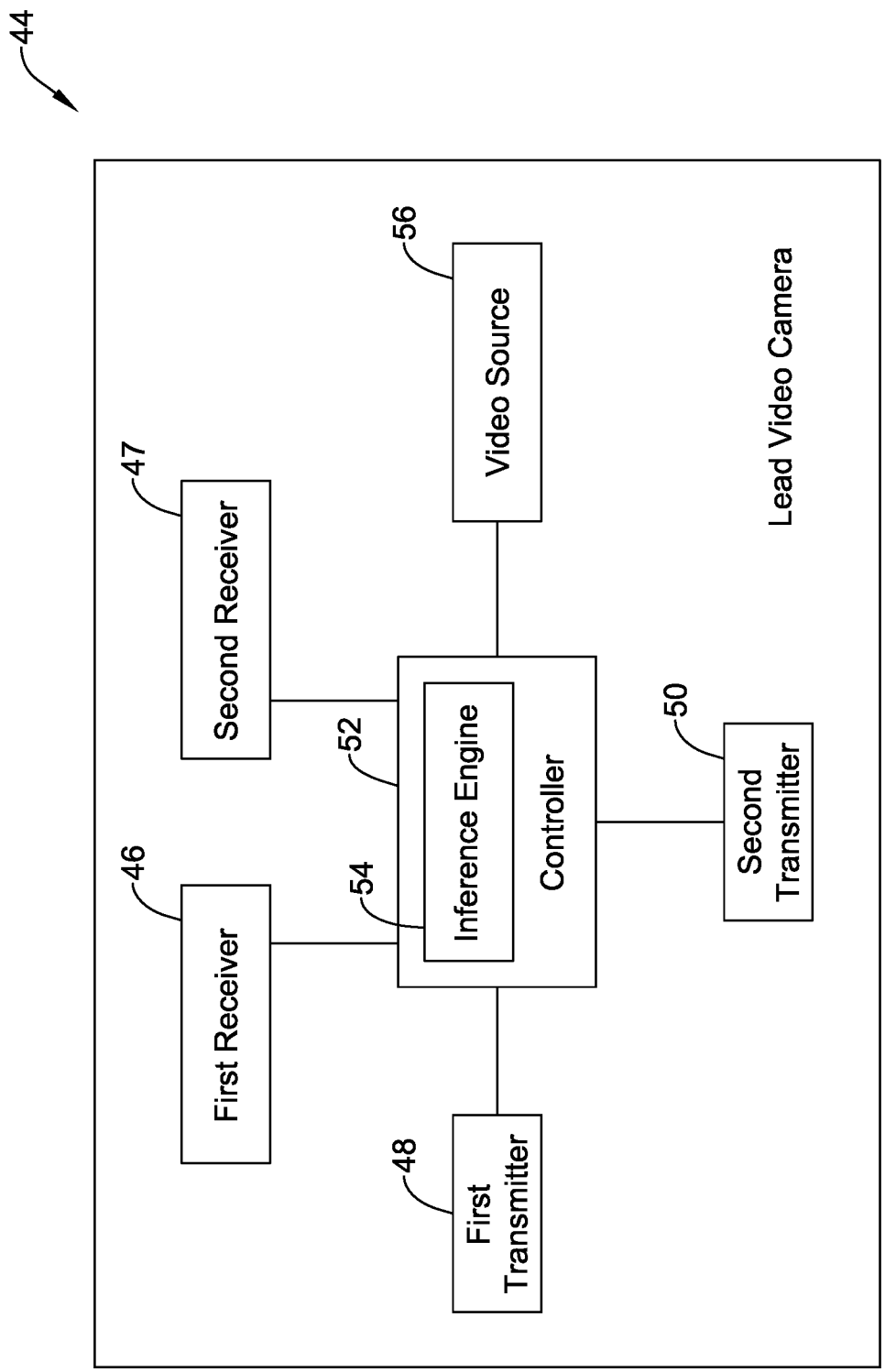
FIG. 3 is a schematic block diagram of an illustrative lead video camera usable in the illustrative video surveillance system of FIG. 1.

FIG. 3 is a schematic block diagram of an illustrative lead video camera 44. The illustrative lead video camera 44 may be considered as being an example of the lead video cameras 18, 22, 26. The lead video camera 44 includes a first receiver 46 for receiving the metadata from the transmitter 38 of each of the plurality of child video cameras 34, including the video images and/or the video clips that represent the events of interest identified by the plurality of child video camera. 34 when provided. The lead video camera 44 also includes a second receiver 47 for receiving metadata and other information from other lead video cameras, for example. The first receiver 46 and the second receiver 47 may receive information over two different communication protocols. The lead video camera 44 also includes a first transmitter 48 for transmitting at least some of the metadata received from the transmitter 38 of one of the plurality of child video cameras 34 to the receiver 40 of another of the plurality of child video cameras 34. The lead video camera 44 also includes a second transmitter 50 for transmitting the metadata received from the transmitters 38 of one or more of the plurality of child video cameras 34, including the video images and/or the video clips that represent the events of interest identified by the one or more of the plurality of child video cameras when provided, to a remote site for recording on a network video recorder such as the NVR 30.

The illustrative lead video camera 44 also includes a controller 52. The controller 52 controls operation of the lead video camera 44, including controlling communications between the lead video camera 44 and any of the child video cameras 34, as well as communications with other lead video cameras 44 and remote sites such as but not limited to the NVR 30. The controller 52 may have analytic capabilities. The controller 52 may determine whether to communicate received information to the child video cameras within its particular camera group. In some cases, the controller 52 may include an inference engine 54 that is configured to process at least some of the metadata received from the transmitter 38 of at least some of the plurality of child video cameras 34 to track a tracked event of interest in time and space in the secured area. In some instances, the inference engine 54 may also provide predictive analytics that can predict event movement. Accordingly, the lead video camera 44 may be able to provide its child video cameras and other lead video cameras 44 with information regarding predicted movement of an event, so that its child video cameras, and other lead video cameras 44 can better direct their corresponding child video cameras to find and track the event of interest. The illustrative lead video camera 44 also includes a video source 56. The video source 56 may be a video camera that is built into the lead video camera 44, for example.

In some cases, the first transmitter 48 of the lead video camera 44 and the receiver 40 of at least one of the plurality of child video cameras 34 may communicate using a first communication protocol. The second transmitter 50 of the lead video camera 44 may communicate with the remote site using a second communication protocol, wherein the second communication protocol is different from the first communication protocol. The second communication protocol may provide a higher bandwidth than the first communication protocol. In some cases, the first communication protocol may include a 4G cellular communication protocol. The second communication protocol may include a 5G cellular communication protocol. These are just examples.

In some cases, as shown for example in FIG. 1 that shows a total of three camera groups 12, 14, 16, each having a respective lead video camera 18, 22, 26, the lead video camera 44 may be configured to notify a lead video camera of an adjacent camera group of a tracked event of interest along with metadata sufficient for the adjacent camera group to identify and track the tracked event of interest. Also, in response to receiving metadata from the transmitter 38 of one of its own child video cameras 34 of a particular event of interest, the lead video camera 44 may transmit at least some of the metadata to the receivers 40 of other of its own child video cameras 34, wherein in response, each edge controller 36 of its plurality of child video cameras 34 may use the received metadata to begin monitoring their corresponding video stream for a matching event of interest.

Figure 4:
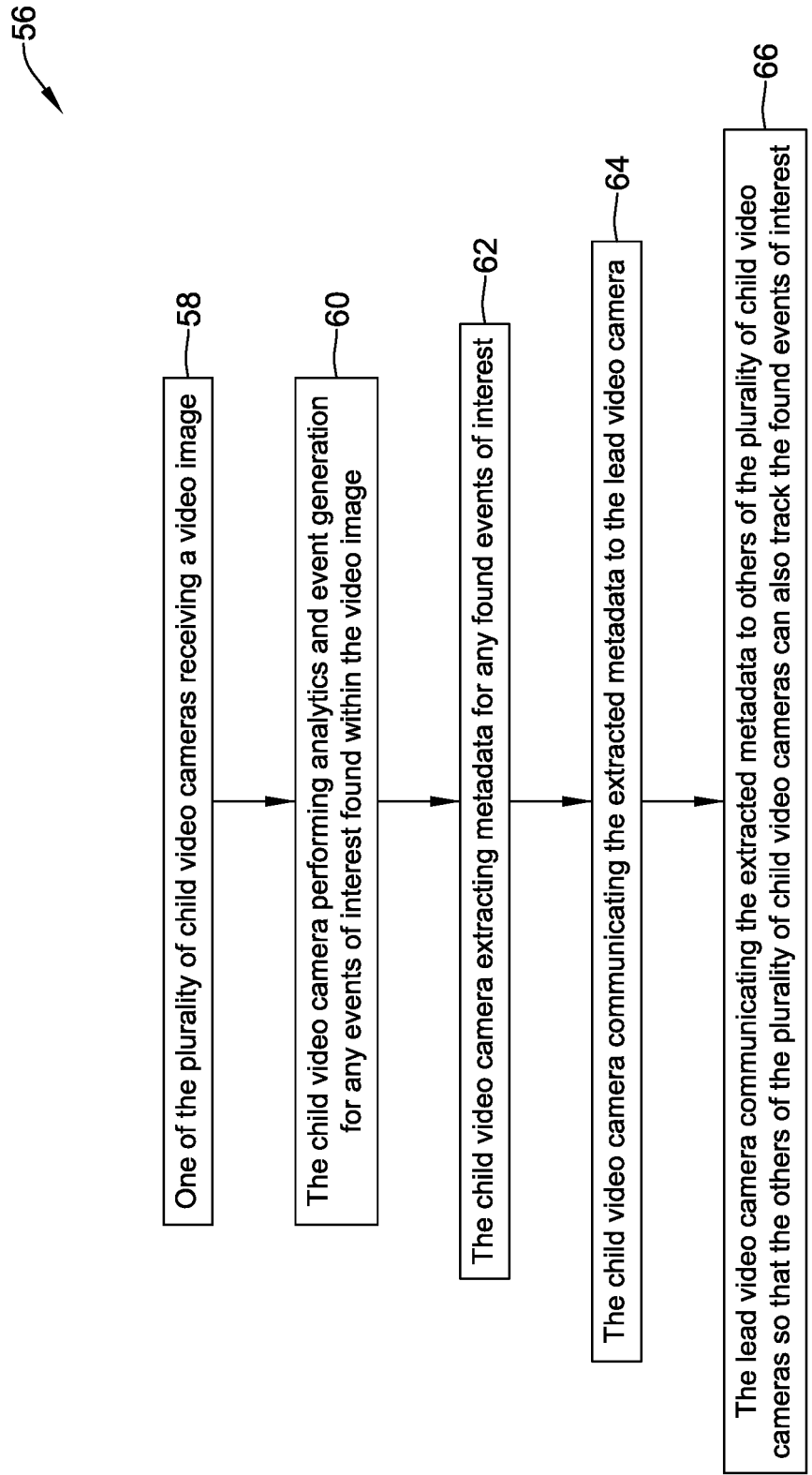
FIG. 4 is a flow diagram showing an illustrative method.

FIG. 4 is a flow diagram showing an illustrative method 57 of detecting and tracking an event of interest using a distributed intelligence video surveillance system (such as the video surveillance system 10) that includes a lead video camera (such as the lead video camera 44) and a plurality of child video cameras (such as the child video camera 34) that are configured to communicate with the lead video camera. The illustrative method 57 includes one of the plurality of child video cameras receiving a video image, as indicated at block 58. The child video camera performs analytics and event generation for any events of interest found within the video image, as indicated at block 60. The child video camera extracts metadata for any found events of interest, as indicated at block 62. The child video camera communicates the extracted metadata to the lead video camera, as indicated at block 64. The lead video camera communicates the extracted metadata to others of its child video cameras so that the others of its child video cameras can also look for and track the found events of interest, as found at block 66.

It will be appreciated that in some cases, each of the plurality of child video cameras may have a unique field of view, and the lead video camera may communicate the extracted metadata to others of the plurality of child video cameras so that each of the others of the plurality of child video cameras is able to look for the found events of interest within video streams corresponding to their own unique fields of view. In some cases, two or more of the plurality of child video cameras each perform analytics and event generation for any events of interest, and each of the two or more child video cameras extract metadata and communicate their extracted metadata to the lead video camera. Example metadata may identify certain event attributes. For example, for a person of interest, the metadata may identify clothing color, approximate height, race, gender, location, speed, wearing a hat, carrying a gun, carrying a bag, color of bag, and so on. The metadata may also include a video image and/or a video clip that represents the corresponding event of interest. These are just examples.

In some cases, the lead video camera may be configured to communicate at least some of the extracted metadata to other lead video cameras so that the other lead video cameras can instruct their own child video cameras to look for images corresponding to the extracted metadata. Each of the plurality of child video cameras may communicate with the lead video camera via a first communication protocol, and the lead video camera may communicate with the other lead video cameras and with a video surveillance system controller via a second communication protocol that provides a higher bandwidth than the first communication protocol. As an example, the first communication protocol may include a 4G cellular communication protocol, and the second communication protocol may include a 5G cellular communication protocol. This is just one example.

Figure 5:
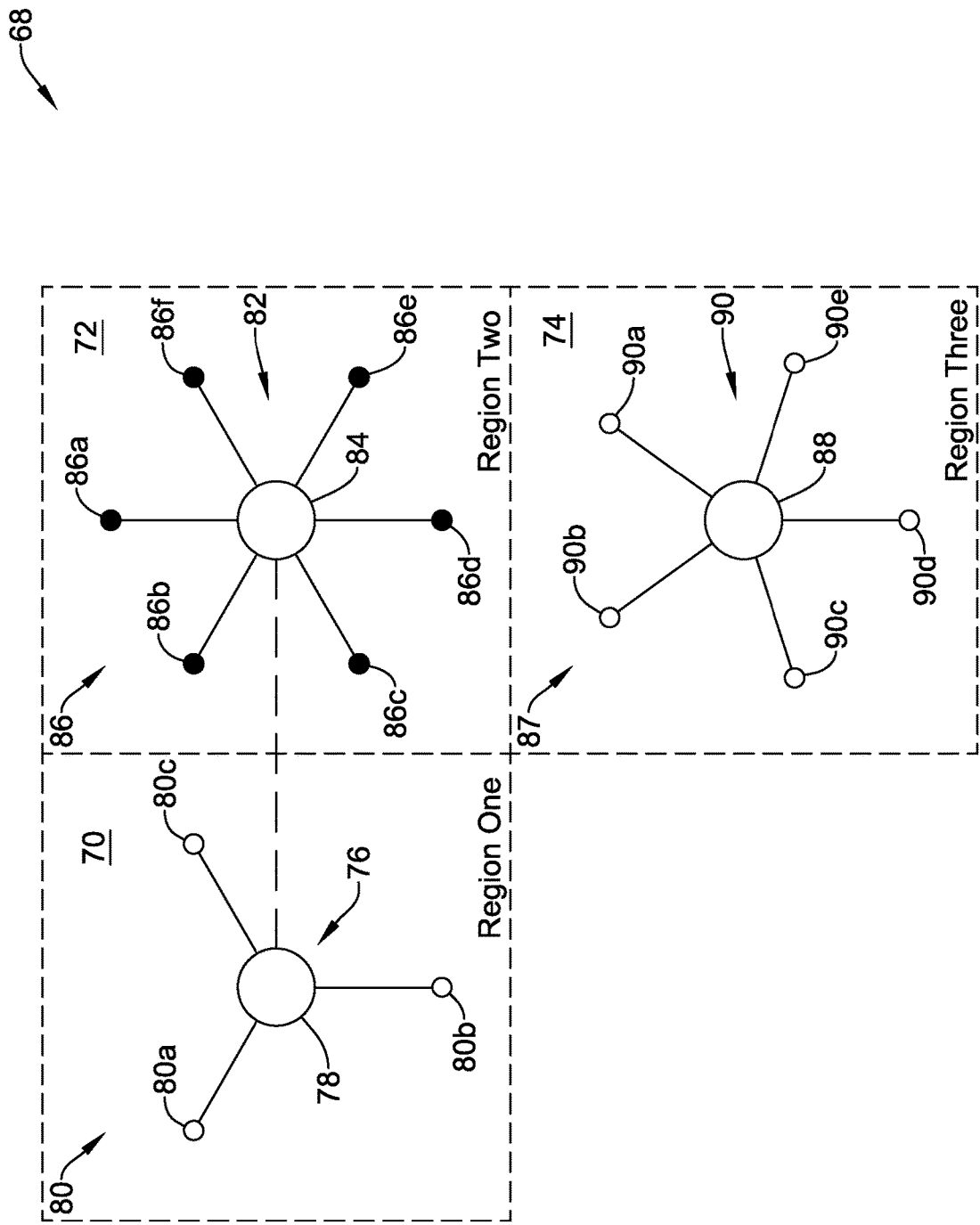
FIG. 5 is a schematic illustration of an example of the illustrative video surveillance system of FIG. 1.

FIG. 5 is a schematic illustration of an example of the illustrative video surveillance system. FIG. 5 shows a facility 68 that is divided into three regions, a Region One labeled as 70, a Region Two labeled as 72 and a Region Three labeled as 74. The facility 68 and each of the regions 70, 72, 74 may generically represent any of a variety of different types of facilities, be it areas within a warehouse, portions of a parking lot or the like. In this example, the Region One labeled as 70 includes a first camera group 76 having a lead video camera 78 and a total of three child video cameras 80 individually labeled as 80a, 80b, 80c. The Region Two labeled as 72 includes a second camera group 82 having a lead video camera 84 and a total of six child video cameras 86 individually labeled as 86a, 86b, 86c, 86d, 86e, 86f. The Region Three labeled as 74 includes a third camera group 87 having a lead video camera 88 and a total of five child video cameras 90 individually labeled as 90a, 90b, 90c, 90d, 90e.

The child video cameras 86 are shown as being highlighted, meaning that one or more of the child video cameras 86 has detected a possible incident or event occurring within the facility 68. In this particular example, say that the child video camera 86f initially detects a suspected intruder. Because each of the child video cameras 86 communicate with the lead video camera 84, the lead video camera 84 is able to automatically share metadata pertaining to the possible intruder with the other child video cameras 86. As a result, the child video cameras 86a and 86b are each able, in turn, to look for and detect the suspected intruder as the suspected intruder moves into and through the field of view of each of the child video cameras 86a and 86b and report back to the lead video camera 84. Because of this, the lead video camera 84 is able to track the movement of the intruder and ascertain that the suspected intruder is moving out of the Region Two labeled as 72 and into the Region One labeled as 70. Consequently, the lead video camera 84 communicates with the lead video camera 78 of Region One 70 in order to share relevant metadata with the camera group 76 located within the Region One labeled as 70. If the suspected intruder was instead moving in a different direction, it is possible that the lead video camera 84 would instead share relevant metadata with the camera group 87 located within the Region Three labeled as 74.

Figure 6:
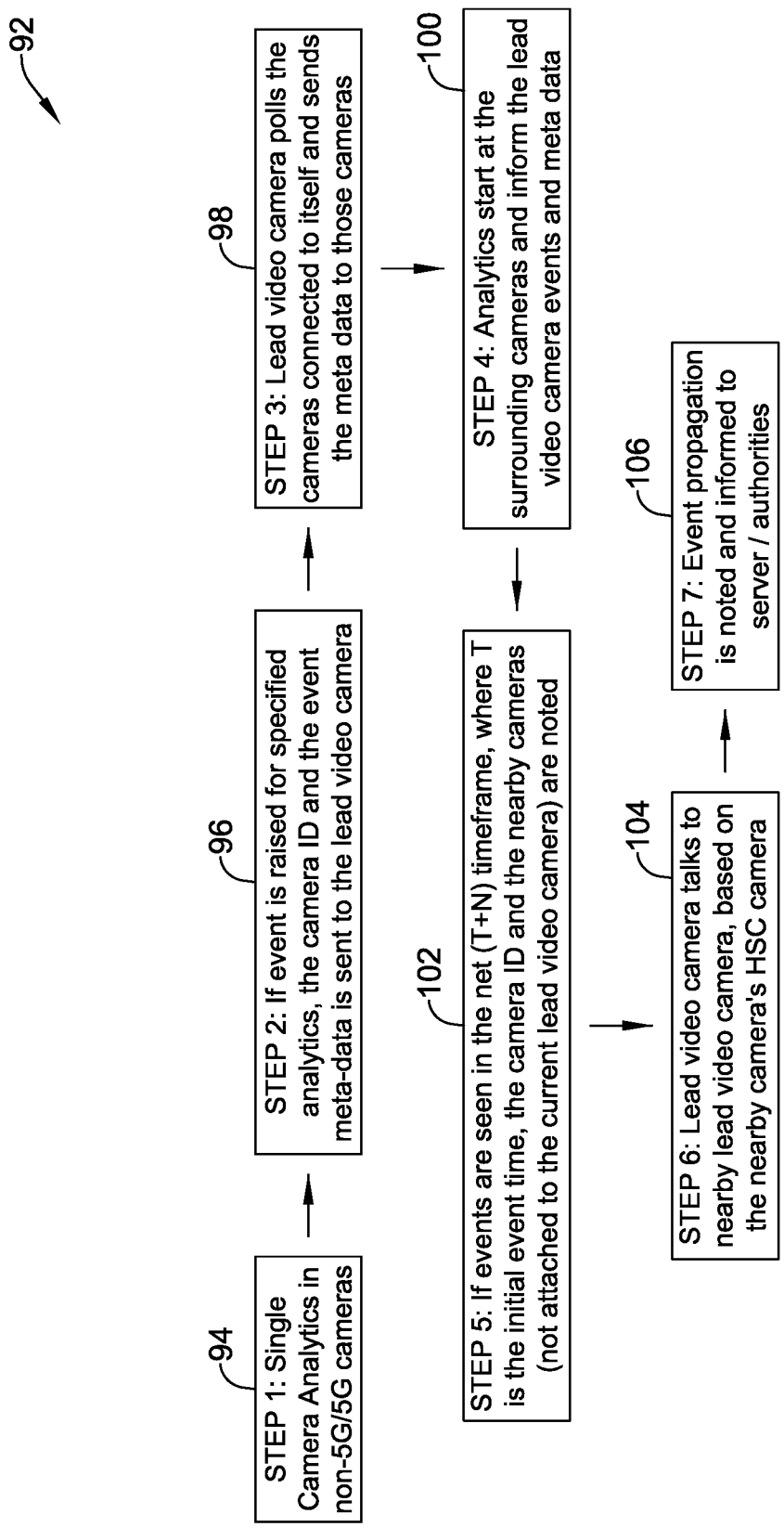
FIG. 6 is a flow diagram showing an illustrative method

FIG. 6 is a flow diagram showing an illustrative method 92 of using multiple cameras for tracking an event. Individual video cameras, including a variety of child video cameras, perform single camera analytics, as indicated at block 94. In one example, these cameras may not be 5G capable. If an event is raised, as indicated at block 96, whichever camera or cameras detected the event will send their camera ID and event metadata to their particular lead video camera. The particular lead video camera will poll the child video cameras that are part of the camera group of the lead video camera and will transmit the event metadata with its child video cameras, as indicated at block 98. Each of the child video cameras may then perform analytics to look for the event based on the received metadata, and inform the lead video camera of any events found and corresponding metadata, as indicated at block 100. If events are seen in the ensuing timeframe, the camera ID and nearby cameras are noted, as indicated at block 102. The lead video camera may then communicate with a nearby lead video camera in order to share the relevant metadata, thereby allowing the nearby lead video camera to lead its camera group in finding and tracking the event, as indicated at block 104. In some cases, and as shown at block 106, event propagation is noted and informed to authorities.

Figure 7:
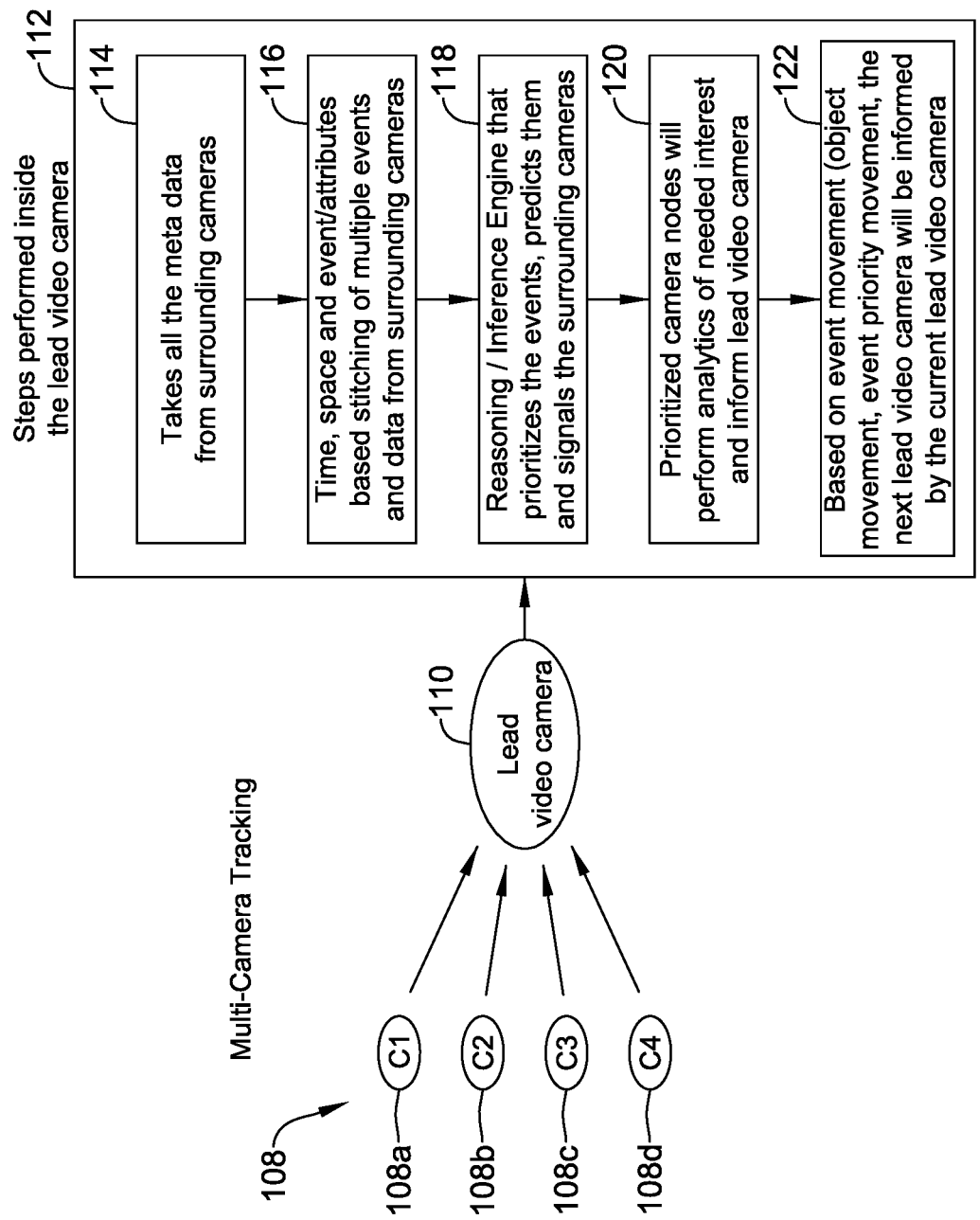
FIG. 7 is a schematic diagram showing multiple camera tracking.

FIG. 7 is a schematic diagram showing multiple camera tracking. In this example, each of a number of child video cameras 108, individually labeled as 108a, 108b, 108c, 108d communicate video images, video clips and other relevant metadata to a lead video camera 110. Box 112 shows some of the steps that may be carried out by the lead video camera 110. The lead video camera 110 takes all of the metadata from surrounding cameras, as indicated at block 114. The lead video camera 110 may stitch together multiple events using metadata provided by other video cameras, as indicated at block 116. A reasoning/inference engine (such as the inference engine 54) prioritizes events and predicts which cameras will most likely be able to capture the events of interests within their fields of view, as indicated at block 118. The prioritized cameras will be notified to perform analytics and provide results back to the lead video camera, as indicated at block 120. Based on event movement, the lead video camera will notify an adjacent lead video camera, as indicated at block 122.

Figure 8:
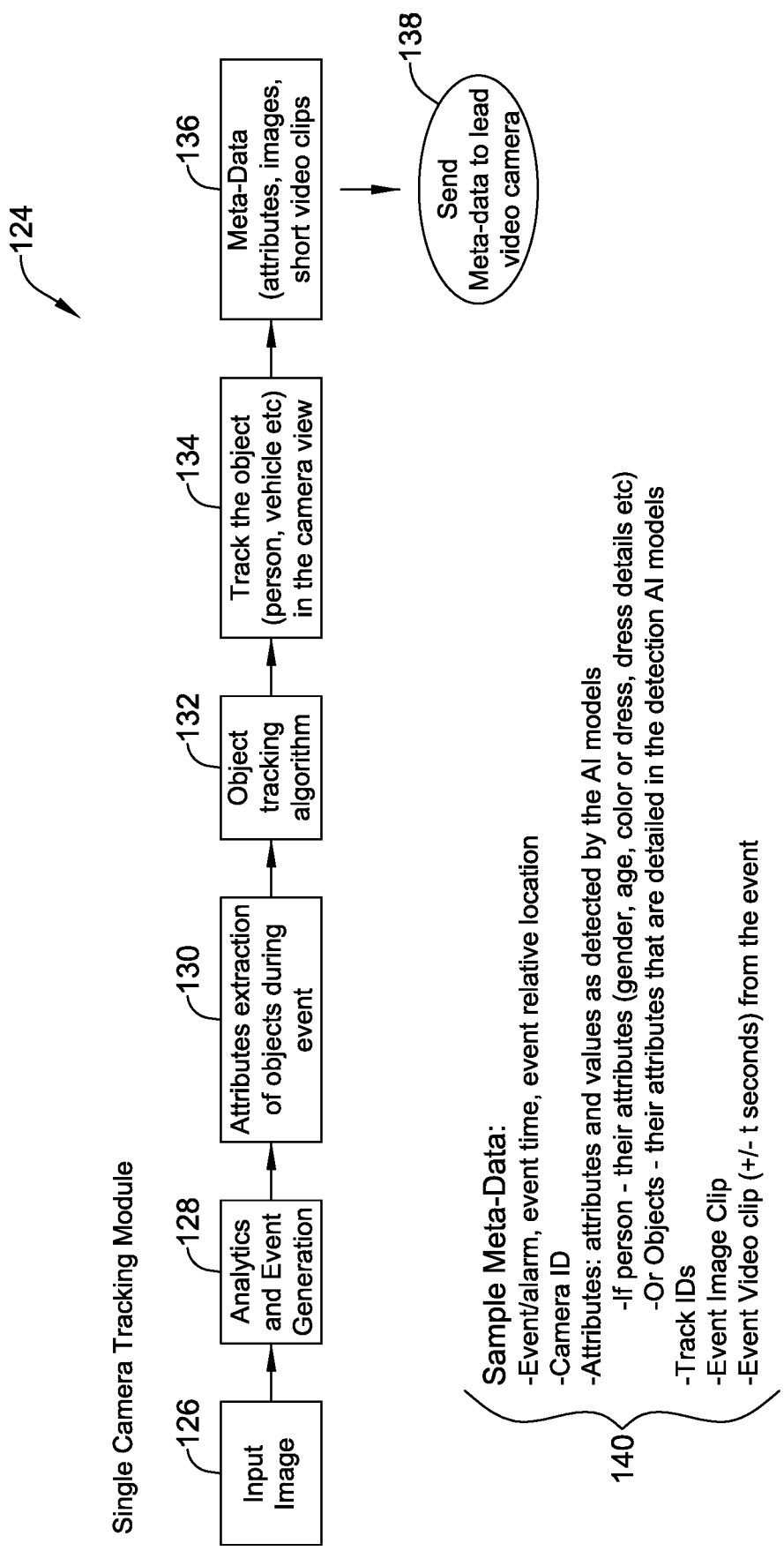
FIG. 8 is a flow diagram showing an illustrative method.

FIG. 8 is a flow diagram showing an illustrative method 124 of performing single camera tracking. An image is received, as indicated at block 126. Analytics and event generation begin within the camera, as indicated at block 128. The attributes of objects found are extracted, as indicated at block 130. An object tracking algorithm may be applied in order to track events or objects, as indicated at block 132. The object (such as a person, vehicle or the like) is tracked within the camera view, as indicated at block 134. Metadata is collected, as indicated at block 136, and is sent to the lead video camera, as indicated at block 138. Table 140 provides examples of types of metadata.

Figure 9:
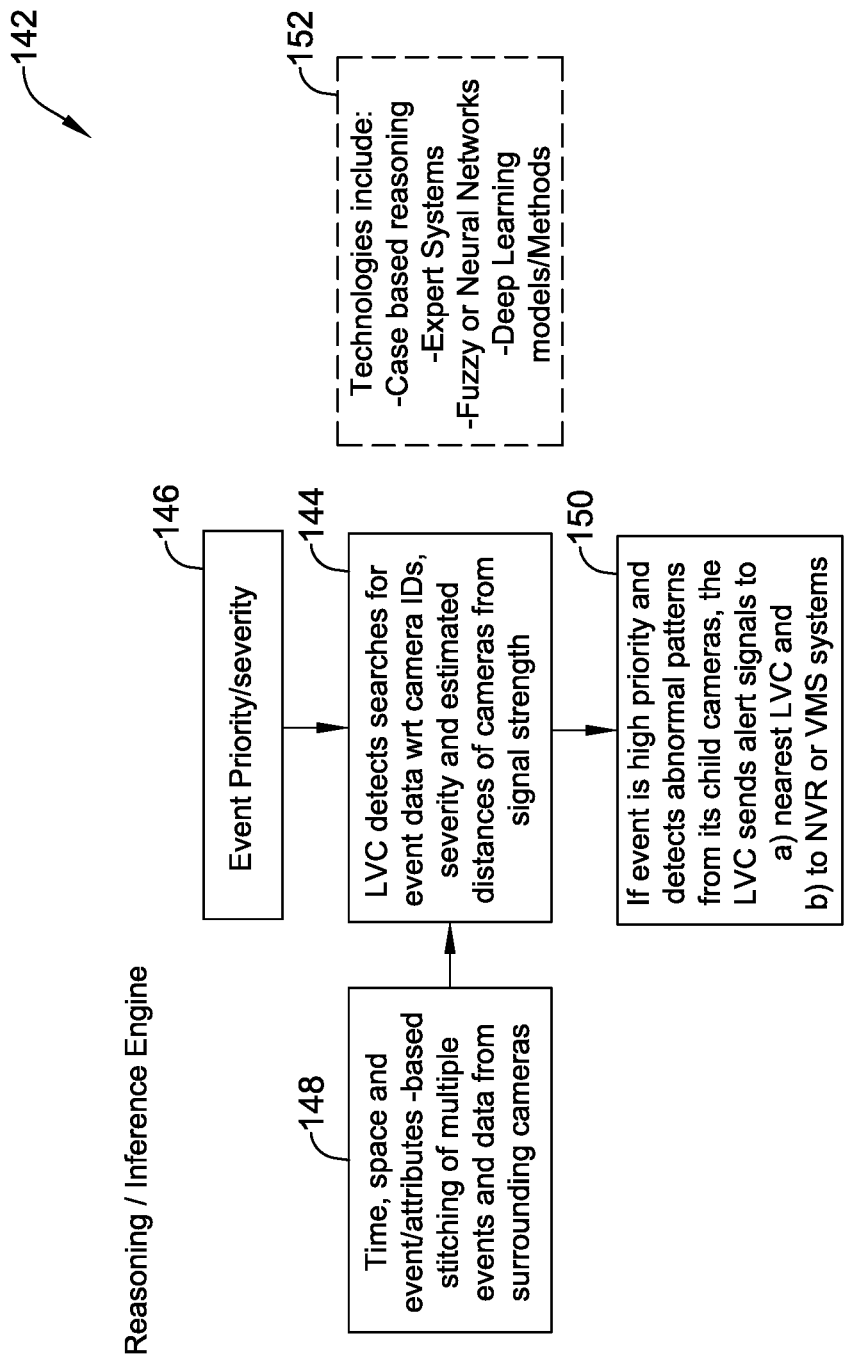
FIG. 9 is flow diagram showing an illustrative method.

FIG. 9 is a flow diagram showing an illustrative method 142 that may be carried out via the inference engine 54 of FIG. 3. Time, space and event attributes are stitched together from multiple cameras, as indicated at block 148. The LVC (lead video camera) may search for attributes related to the event in all child video cameras, and assessing the importance or severity of the events, as indicated at block 144. For example, if people are gathering and in different scenes there are fights and crowds, the severity may be labeled as high. In addition to events details, the inference engine 54 may also detects abnormal patterns in the video clips and then assess the situation. The determined event priority/severity may be informed using event priority/severity rules or models 146. If the event is high priority and abnormal patterns are detected from child video cameras, the LVC may send alert signals to the nearest other LVC and/or to a remote system such as but not limited to the NVR 30, as indicated at block 150. It is contemplated that example but non-limiting technologies that may be applied within the inference engine 54 include, but are not limited to, case based reasoning, expert systems, fuzzy logic, neural networks, deep learning models/methods, and/or any other suitable technology.

Figure 10:
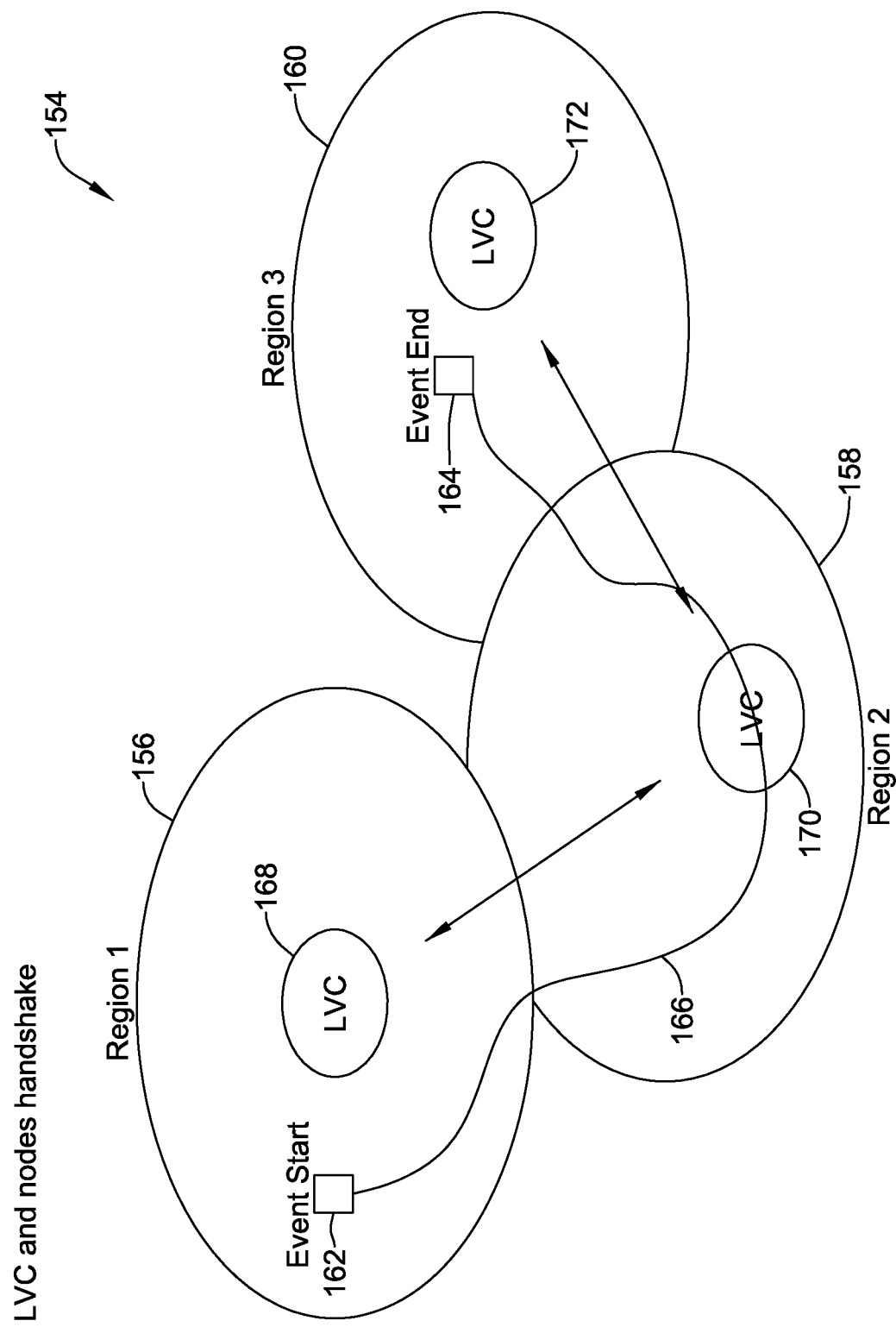
FIG. 10 is a schematic block diagram showing cooperation between neighboring lead video cameras to track an incident.

FIG. 10 is a schematic block diagram 154 showing cooperation between neighboring lead video cameras, particularly in tracking an event that moves from one region to another region. Within the diagram 154 is a Region One labeled as 156, a Region Two labeled as 158 and a Region Three labeled as 160. While a total of three regions 156, 158, 160 are shown, it will be appreciated that in some cases a moving event may extend through a large number of regions. In this particular example, an event started at a starting point 162 within the Region One labeled as 156 and ended at an ending point 164 within the Region Three labeled as 160. The event traversed along an event path 166 through each region 156, 158, 160. While the event remained within the Region One labeled as 156, an LVC (lead video camera) 168 manages its child video cameras (not shown) to track the event. As the event travels towards the Region Two labeled as 158, the LVC 168 of Region One communicates metadata regarding the event to an LVC 170 within the Region Two labeled as 158. As the event travels towards the Region Three labeled as 160, the LVC 170 of Region Two communicates metadata regarding the event to an LVC 172 within the Region Three labeled as 160. In some cases, the metadata collected by the three LVC's 168, 170 and 172 from all three regions may be transmitted to and recorded at a remote site such as NVR 30. In some cases, the metadata from each child camera may include a video image and/or a video clip that represents the corresponding detected event of interest.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

The invention claimed is:

1. A video surveillance system configured to provide surveillance for a secured area, the video surveillance system comprising:
   a camera group including a lead video camera and a plurality of selected child video cameras that are configured to communicate with the lead video camera, the lead video camera and each of the plurality of selected child video cameras are configured to capture a video stream corresponding to a field of view of the respective video camera;
   the lead video camera configured to determine a received signal strength (RSSI) parameter associated with each of a plurality of active child video cameras, and to determine which of the plurality of active child video cameras are included in the camera group as one of the plurality of selected child video cameras based on the RSSI parameters;
   each of the plurality of selected child video camera comprising:
      an edge controller that monitors its corresponding video stream for one or more predefined events of interest, and when one of the predefined events of interest is found, the edge controller performs analytics to generate metadata pertaining to the corresponding event of interest, wherein the metadata includes a video image and/or a video clip that represents the corresponding event of interest;
      a transmitter for transmitting the generated metadata to the lead video camera, including the video image and/or the video clip that represents the corresponding event of interest;
      a receiver for receiving metadata;
   the lead video camera comprising:
      a receiver for receiving the metadata from the transmitter of each of the plurality of selected child video cameras in the camera group, including the video images and/or the video clips that represent the events of interest identified by the plurality of selected child video cameras;
      a first transmitter for transmitting at least some of the metadata received from the transmitter of one of plurality of selected child video cameras to the receiver of another of the plurality of selected child video cameras; and
      a second transmitter for transmitting the metadata received from the transmitters of one or more of the plurality of selected child video cameras, including the video images and/or the video clips that represent the events of interest identified by the one or more of the plurality of selected child video cameras, to a remote site for recording on a network video recorder.

2. The video surveillance system of claim 1, wherein the first transmitter of the lead video camera and the receiver of at least one of the plurality of selected child video cameras communicate using a first communication protocol.

3. The video surveillance system of claim 2, wherein the second transmitter of the lead video camera communicates with the remote site using a second communication protocol, wherein the second communication protocol is different from the first communication protocol.

4. The video surveillance system of claim 3, wherein second communication protocol provides a higher bandwidth than the first communication protocol.

5. The video surveillance system of claim 4, wherein the first communication protocol comprises a wireless communication protocol.

6. The video surveillance system of claim 4, wherein the second communication protocol comprises a 5G cellular communication protocol.

7. The video surveillance system of claim 1, wherein one or more of the predefined events of interest comprises a presence of person having one or more predetermined characteristics, a group of people having one or more predetermined characteristics, a person exhibiting one or more predetermined behaviors, a group of people exhibiting one or more predetermined behaviors, an animate object having one or more predetermined characteristics and/or an animate object exhibiting one or more predetermined behaviors.

8. The video surveillance system of claim 1, wherein one or more of the predefined events of interest comprises a presence of an inanimate object having one or more predetermined characteristics or a group of inanimate objects having one or more predetermined characteristics.

9. The video surveillance system of claim 1, wherein the metadata generated by one or more of the plurality of child video cameras comprises information identifying the particular selected child video camera or one or more features of the identified event of interest.

10. The video surveillance system of claim 1, wherein the camera group comprises the lead video camera and each selected child video camera has an RSSI parameter that is above a predetermined RSSI threshold.

11. The video surveillance system of claim 1, wherein the lead video camera comprises an inference engine that processes at least some of the metadata received from the transmitter of at least some of the plurality of selected child video cameras to track a tracked event of interest in time and space in the secured area.

12. The video surveillance system of claim 11 further comprising an adjacent camera group, wherein the lead video camera is configured to notify a lead video camera of the adjacent camera group of the tracked event of interest along with metadata sufficient for the adjacent camera group to identify and track the tracked event of interest.

13. The video surveillance system of claim 1, wherein in response to receiving metadata from the transmitter of one of the plurality of selected child video cameras of a particular event of interest, the lead video camera transmitting at least some of the metadata to the receivers of the plurality of selected child video cameras, wherein in response, each edge controller of the plurality of selected child video cameras using the received metadata to begin monitoring their corresponding video stream for a corresponding event of interest.

14. A method of detecting and tracking an event of interest using a distributed intelligence video surveillance system comprising a camera group of a lead video camera and a plurality of child video cameras that are each configured to communicate metadata with the lead video camera, the method comprising:
   determining a received signal strength (RSSI) parameter for communication between each of a plurality of active lead video cameras with each of a plurality of active child video cameras;
   identifying the lead video camera of the camera group from the plurality of active lead video cameras and/or identifying the plurality of child video cameras of the camera group from the plurality of active child video cameras based on the RSSI parameters;

one of the plurality of child video cameras of the camera group receiving a video image;

the child video camera performing analytics and event generation for any events of interest found within the video image;

the child video camera extracting metadata for any found events of interest;

the child video camera communicating the extracted metadata to the lead video camera via a first communication protocol;

the lead video camera communicating the extracted metadata to others of the plurality of child video cameras of the camera group via the first communication protocol so that the others of the plurality of child video cameras in the camera group can also track the found events of interest; and the lead video camera communicating at least some of the extracted metadata to one or more other lead video cameras of one or more other camera groups via a second communication protocol so that the one or more other lead video cameras can instruct their own child video cameras to look for images corresponding to the extracted metadata, wherein the second communication protocol provides a higher bandwidth communication channel than the first communication protocol.

15. The method of claim 14, wherein each of the plurality of child video cameras of the camera group have a unique field of view, and the lead video camera of the camera group communicates the extracted metadata to others of the plurality of child video cameras of the camera group so that each of the others of the plurality of child video cameras of the camera group is able to look for the found events of interest within video streams corresponding to their own unique fields of view.

16. The method of claim 14, wherein two or more of the plurality of child video cameras of the camera group each perform analytics and event generation for any events of interest, and each of the two or more child video cameras of the camera group extract metadata and communicate their extracted metadata to the lead video camera of the camera group.

17. The method of claim 14, wherein the first communication protocol comprises a 4G cellular communication protocol, and the second communication protocol comprises a 5G cellular communication protocol.

18. A video surveillance system configured to provide surveillance for a secured area, the video surveillance system comprising:

a camera group including a selected lead video camera and a plurality of selected child video cameras that are configured to communicate with the lead video camera, the lead video camera and each of the plurality of selected child video cameras are configured to capture a video stream corresponding to a field of view for the respective video camera;

each of the plurality of selected child video cameras of the camera group configured to determine a received signal strength (RSSI) parameter for each of a plurality of active lead video cameras, and to associate with the selected lead video camera and become a member of the camera group based on the RSSI parameters;

each of the plurality of selected child camera configured to:
analyze its video stream for an event of interest;
when an event of interest is found, each selected child camera of the camera group is further configured to:
capture metadata from its video stream, the metadata pertaining to the event of interest;
transmit the captured metadata to the selected lead video camera of the camera group via a first communication protocol having a first bandwidth;

the selected lead video camera of the camera group configured to:
receive metadata from each of the plurality of selected child video cameras of the camera group via the first communication protocol; and
communicate with other lead cameras of other camera groups via a second communication protocol having a second bandwidth that is higher than the first bandwidth.

* * * * *